(12) United States Patent
Roberto et al.

(10) Patent No.: US 10,828,711 B2
(45) Date of Patent: Nov. 10, 2020

(54) TOOL FOR FACILITATING REMOVAL OF A BROKEN EXHAUST MANIFOLD STUD FROM A CYLINDER HEAD AND METHOD OF USING SAME

(71) Applicants: Marco Roberto, Montreal (CA); Carlo Roberto, Montreal (CA)

(72) Inventors: Marco Roberto, Montreal (CA); Carlo Roberto, Montreal (CA)

(73) Assignee: GESTION ROBERTO INC., Montréal (CA)

( * ) Notice: Subject to any disclaimer, the term of this patent is extended or adjusted under 35 U.S.C. 154(b) by 162 days.

(21) Appl. No.: 16/122,448

(22) Filed: Sep. 5, 2018

(65) Prior Publication Data
US 2019/0091787 A1  Mar. 28, 2019

(51) Int. Cl.
*B23K 9/00* (2006.01)
*B25B 23/00* (2006.01)
*B25B 27/18* (2006.01)

(52) U.S. Cl.
CPC ........ *B23K 9/0026* (2013.01); *B25B 23/0085* (2013.01); *B25B 27/18* (2013.01)

(58) Field of Classification Search
CPC ............ B23B 2215/24; B23B 2247/00; B23B 2247/12; B23B 47/28; B23B 47/284; B23B 49/02; B23B 49/023; B23B 49/026; B25B 23/0085; B25B 23/10; B25B 23/08; B25B 9/00
See application file for complete search history.

(56) References Cited

U.S. PATENT DOCUMENTS

| | | | |
|---|---|---|---|
| 1,412,965 A * | 4/1922 | Pridemore | B25B 23/0085 81/13 |
| 1,495,468 A | 5/1924 | Woerpel | |
| 2,669,894 A * | 2/1954 | Kassel | B25B 13/06 81/13 |
| 2,931,257 A * | 4/1960 | Horrocks | B25B 23/10 81/13 |
| 3,599,369 A | 8/1971 | Carlson | |
| 3,769,648 A * | 11/1973 | Haselmo | B23G 1/48 470/209 |
| 4,406,188 A | 9/1983 | Mills | |
| 4,787,273 A | 11/1988 | Griffith | |
| 5,188,008 A * | 2/1993 | States | B25B 13/04 81/13 |
| 5,887,492 A | 3/1999 | De Laney | |
| 6,302,000 B1 | 10/2001 | Smith | |

(Continued)

FOREIGN PATENT DOCUMENTS

DE  102010045082  4/2012
JP  3267471  11/1991

(Continued)

*Primary Examiner* — Tyrone V Hall, Jr.
(74) *Attorney, Agent, or Firm* — Benoit & Cote, Inc.; C. Marc Benoit

(57) ABSTRACT

A tool for facilitating removal of a broken exhaust manifold stud from a cylinder head. The tool includes an aperture receiving a nut element thereinto and a mounting aperture. The tool is configured so that when a protruding exhaust manifold stud in received in the mounting aperture, the nut can be positioned adjacent the broken exhaust manifold stud for welding the latter and the former together.

18 Claims, 2 Drawing Sheets

(56) References Cited

U.S. PATENT DOCUMENTS

| | | | | |
|---|---|---|---|---|
| 6,435,781 B1 * | 8/2002 | Jones | ................... | B23B 49/02 |
| | | | | 29/426.4 |
| 2005/0155211 A1 | 7/2005 | Powell | | |
| 2005/0204542 A1 * | 9/2005 | Pittman | ............... | B23B 47/284 |
| | | | | 29/566 |
| 2011/0239831 A1 | 10/2011 | Cole | | |
| 2014/0133928 A1 * | 5/2014 | Beydler | ............... | B23B 49/026 |
| | | | | 408/115 R |

FOREIGN PATENT DOCUMENTS

| | | |
|---|---|---|
| JP | 4084680 | 3/1992 |
| JP | 5042433 | 2/1993 |
| JP | 8338414 | 12/1996 |
| JP | 2002235722 | 8/2002 |

\* cited by examiner

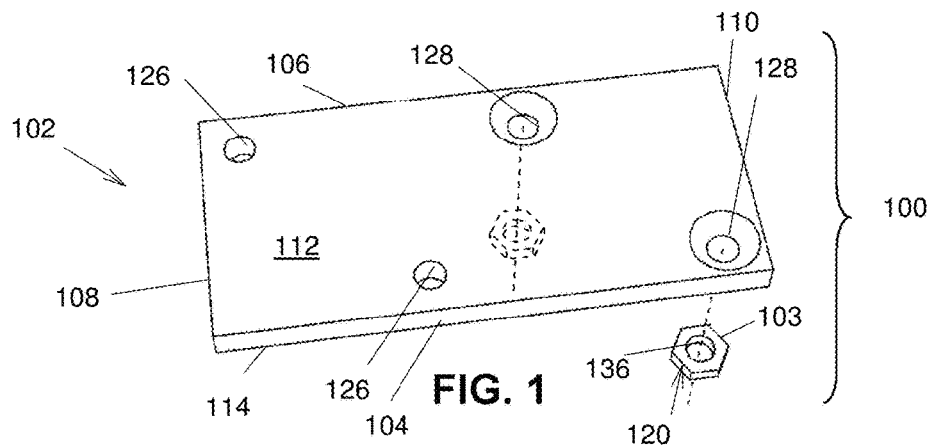
FIG. 1
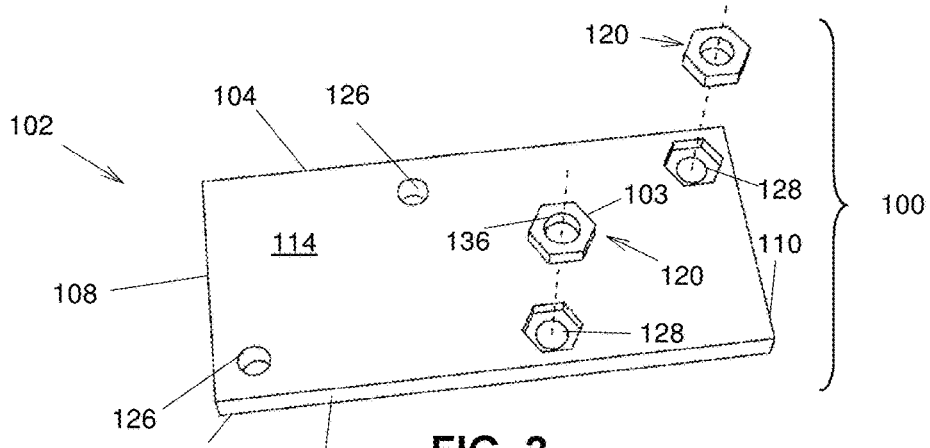
FIG. 2
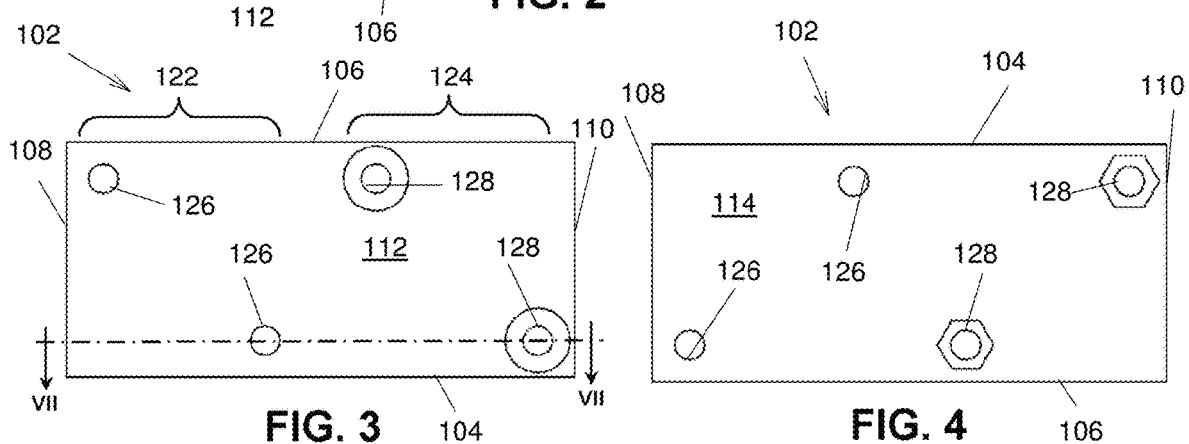
FIG. 3
FIG. 4
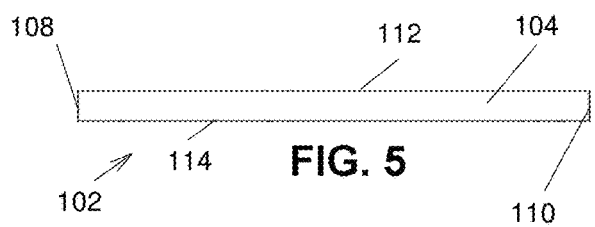
FIG. 5
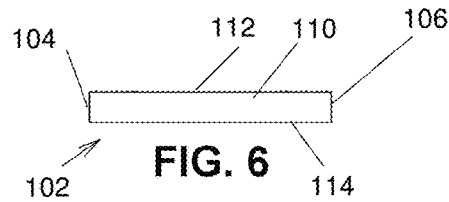
FIG. 6

TOOL FOR FACILITATING REMOVAL OF A BROKEN EXHAUST MANIFOLD STUD FROM A CYLINDER HEAD AND METHOD OF USING SAME

FIELD OF THE INVENTION

The present invention relates to the general field of automotive mechanics and is more specifically concerned with a tool for facilitating removal of a broken exhaust manifold stud from a cylinder head and a method of using same.

BACKGROUND

An exhaust manifold is typically mounted to the cylinder head of a combustion engine through multiple pairs of threaded stud and nut combinations extending perpendicularly outwardly from a side surface of the cylinder head of the engine block, and opposed on each side of each exhaust port defined therealong.

Due to the various torsion forces involved between the engine block and the exhaust manifold during the operation of the combustion engine, it often occurs that one or more exhaust manifold studs get broken off at the junction thereof with the surface of the cylinder head.

In such instances, the repair procedure typically consists in removing the remaining nuts engaged on the other studs, followed with removing the exhaust manifold and, finally, using one of the well known tools and methods typically used for removing the remaining threaded portion of a broken stud or screw engaged in a threaded bore. Hence, a new stud may be installed and the engine reassembled.

One known tool and method includes drilling a pilot hole centrally through the visible end of the broken stud in the cylinder head, followed with firmly engaging a left-turn screw extractor therein. By turning the screw extractor counter clockwise using a tap wrench, the broken stud is removed.

Another tool and method includes, here again, drilling a pilot hole centrally through the end of the broken stud in the cylinder head, followed with gluing therein a bolt-like element using a strong metal cement such as LocTite® or equivalent. The broken stud may then be unscrewed and removed using a conventional key or ratchet.

But when using these known tools and methods a problem is often encountered in that there is generally insufficient space between the cylinder head and adjacent engine components or body panels in order to apply them properly.

For example, it is often difficult to have a direct visual contact with the visible end portion of the broken stud along the surface around the concerned exhaust port since the latter is often directed at a slight angle towards the ground, such as on a V8 engine. It is thus difficult to punch a well centered punch hole for guiding the pilot drill. It is further difficult to drill the pilot hole itself since there is often not enough room to properly position and align a hand drill or the like in the limited space.

In many cases, engine maintenance personnel often end up having to remove the cylinder head or the entire combustion engine from the vehicle in order to complete the proper removal of the broken stud. These extra steps in the replacement of broken studs largely inflate the time and cost to complete the repair of a single stud.

Against this background, there exists a need in the industry to provide improved tools and methods of removing broken exhaust manifold studs. An object of the present invention is therefore to provide such tools and methods.

SUMMARY OF THE INVENTION

In a broad aspect, the invention provides an assembly usable in combination with a welding head, the assembly comprising: a cylinder head having first and second exhaust ports, a broken exhaust manifold stud being mounted in the cylinder head adjacent the first exhaust port and a protruding exhaust manifold stud being mounted in the cylinder head adjacent the second exhaust port and protruding from the cylinder head; and a tool including a nut element defining a nut aperture extending therethrough; a body positioned adjacent the cylinder head, the body defining a first surface and an opposed second surface, the body defining a mounting aperture and a nut holding aperture each extending between the first and second surfaces, the mounting and nut holding apertures being in register respectively with the protruding exhaust manifold stud and the broken exhaust manifold stud, the first surface facing the cylinder head; wherein the mounting aperture substantially snugly receives the protruding exhaust manifold stud thereinto; wherein the nut holding aperture defines a nut receiving portion extending from the first surface, the nut element being received in the nut receiving portion; a welding head portion extending from the second surface configured and sized for receiving the welding head; and an intermediate portion extending therebetween, the intermediate portion being narrower than the nut element.

There may also be provided an assembly wherein the body is substantially plate-shaped.

There may also be provided an assembly wherein the body is made of a non-weldable material and the nut element is made of a hard steel.

There may also be provided an assembly wherein the welding head portion is substantially spherical cap shaped.

There may also be provided an assembly wherein the nut element has an hexagonal peripheral edge and the nut receiving portion has a substantially hexagonal transversal cross-sectional configuration.

There may also be provided an assembly wherein the intermediate portion has a diameter substantially similar to a diameter of the protruding exhaust manifold stud.

There may also be provided an assembly wherein an additional protruding exhaust manifold stud is mounted in the cylinder head adjacent the second exhaust port and protrudes from the cylinder head, the body defining an additional mounting aperture in register with the additional protruding exhaust manifold stud and receiving the additional exhaust manifold stud thereinto.

There may also be provided an assembly wherein the body defines an additional mounting aperture and an additional nut holding aperture each extending between the first and second surfaces, the additional mounting and nut holding apertures being configured and sized to be in register respectively with mirror images of the protruding exhaust manifold stud and broken exhaust manifold stud.

There may also be provided an assembly wherein the broken exhaust manifold stud is sectioned substantially flush with the cylinder head.

In another broad aspect, the invention provides a tool usable in combination with a welding head for facilitating removal of a broken exhaust manifold stud from a cylinder head having first and second exhaust ports, the broken exhaust manifold stud being mounted in the cylinder head adjacent the first exhaust port, a protruding exhaust manifold stud being mounted in the cylinder head adjacent the second exhaust port and protruding from the cylinder head, the tool comprising: a nut element defining a nut aperture extending therethrough; a body, the body defining a first surface and an opposed second surface, the body defining a mounting aperture and a nut holding aperture each extending between the first and second surfaces, the mounting and nut holding apertures being configured and sized to be in register respectively with the protruding exhaust manifold stud and the broken exhaust manifold stud when the body is operatively positioned substantially adjacent the cylinder head with the first surface facing the cylinder head; wherein the mounting aperture is configured and sized for substantially snugly receiving the protruding exhaust manifold stud thereinto; wherein the nut holding aperture defines a nut receiving portion extending from the first surface, the nut element being received in the nut receiving portion; a welding head portion extending from the second surface configured and sized for receiving the welding head; and an intermediate portion extending therebetween, the intermediate portion being narrower than the nut element.

There may also be provided a tool wherein the body is substantially plate-shaped.

There may also be provided a tool wherein the body is made of a non-weldable material and the nut element is made of a hard steel.

There may also be provided a tool wherein the welding head portion is substantially spherical cap shaped.

There may also be provided a tool wherein the nut element has an hexagonal peripheral edge and the nut receiving portion has a substantially hexagonal transversal cross-sectional configuration.

There may also be provided a tool wherein the intermediate portion has a diameter substantially similar to a diameter of the protruding exhaust manifold stud.

There may also be provided a tool wherein an additional protruding exhaust manifold stud is mounted in the cylinder head adjacent the second exhaust port and protrudes from the cylinder head, the body defining an additional mounting aperture configured and sized to be in register with the additional protruding exhaust manifold stud when the body is operatively positioned substantially adjacent the cylinder head with the first surface facing the cylinder head.

There may also be provided a tool wherein the body defines an additional mounting aperture and an additional nut holding aperture each extending between the first and second surfaces, the additional mounting and nut holding apertures being configured and sized to be in register respectively mirror images of the protruding exhaust manifold stud and broken exhaust manifold stud when the body is operatively positioned substantially adjacent the cylinder head with the first surface facing the cylinder head.

In yet another broad aspect, the invention provides a method of using the tool as defined above, the method comprising: inserting the nut element in the nut receiving portion; positioning the body adjacent the cylinder head with the first surface facing the cylinder head, the protruding exhaust manifold stud inserted in the mounting aperture and the nut element substantially adjacent the broken exhaust manifold stud; welding the nut element to the broken exhaust manifold stud through the nut aperture; removing the body away from the cylinder head; removing the broken exhaust manifold stud from the cylinder head by unscrewing the broken exhaust manifold stud using the nut element welded to the broken exhaust manifold stud.

Thus, the present invention describes a tool and a method that facilitate the removal of a broken exhaust manifold stud in the cylinder head of a combustion engine installed in an engine bay defining limited space in the vicinity of the cylinder head. Furthermore, the relatively compact format of the tool and method of the present invention allows maintenance personnel to save a significant amount of time, and thus, overall costs of repair for such a maintenance operation, when compared to known tools and methods, since the removal of the cylinder head, or the entire engine in some instances, can often be avoided to complete the repair.

The present application claims priority from UK Request for a Patent 1715542.5 filed Sep. 22, 2017, the contents of which is hereby incorporated by reference in its entirety.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 1, in a perspective, exploded view, illustrates an embodiment of a tool for removing a broken exhaust manifold stud in accordance with an embodiment of the present invention;

FIG. 2, in an alternative perspective, exploded view, illustrates the tool in FIG. 1, FIG. 3, in a top plan view, illustrates a body part of the tool in FIG. 1;

FIG. 4, in a bottom plan view, illustrates the body in FIG. 3;

FIG. 5, in a longitudinal side elevational view, illustrates the body in FIG. 3;

FIG. 6, in an end elevational view, illustrates the body in FIG. 3;

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Figure 9:
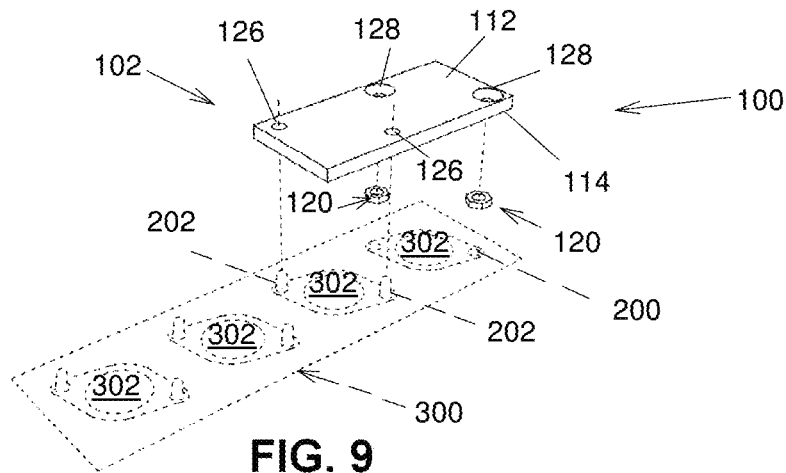
FIG. 9, in a perspective view, illustrates a step in an embodiment of a method of removing a broken exhaust manifold stud using the tool in FIG. 1.

FIGS. 1 to 7 inclusively illustrate various aspects of an embodiment, according to the present invention, of a tool 100 for facilitating removal of a broken exhaust manifold stud 200 from a cylinder head 300 (as best illustrated in FIG. 9). For example, the broken exhaust manifold stud 200 is sectioned substantially flush with the cylinder head 300. The tool 100 is usable in combination with a welding head 400.

The cylinder head 300 defines at least two adjacent exhaust ports 302. A broken exhaust manifold stud 200 is mounted in the cylinder head 300 adjacent a first one of the exhaust ports 302, and a protruding exhaust manifold stud 202 is mounted in the cylinder head 300 adjacent a second one of the exhaust ports 302. The protruding exhaust manifold stud 202 protrudes from the cylinder head 300, and is either an intact stud or a stud that has been sectioned away from the end face of the cylinder head 300. Typically, the cylinder head 300 includes a pair of exhaust manifold studs 200 or 202 extending on diametrically opposed side of each exhaust port 302, but by suitably configuring the tool 100, the tool 100 may be used with other configurations of exhaust manifold studs 200 or 202.

Referring to FIGS. 1 and 2, the tool 100 generally includes a body 102 and at least one nut element 120. In some embodiments, the body 102 has a generally plate-shaped configuration defining respectively a first and a second longitudinal side 104 and 106, a first and a second opposed end 108 and 110, and opposed first and second surfaces 114 and 112. For example, the body 102 may have a substantially rectangular configuration as illustrated in the drawings. Other configurations for the body 102 are also possible. As illustrated in FIG. 9, the body 102 has a longitudinal dimension that is at least slightly greater than the overall width dimension of two adjacent exhaust ports 302 defined in the cylinder head 300, including their respective exhaust manifold studs 200 and 202 extending outwardly on each side thereof. As best illustrated in FIG. 2, the body 102 has a thickness dimension that is at least slightly greater than the thickness dimension, or longitudinal length, of the nut element 120, which will be described further bellow.

The body 102 is made of a substantially rigid and high temperature resistant material that can resist heat damage caused by a welding arc in abutting proximity therewith. Furthermore, this material is a non-weldable material, that is a material that will not weld with melted metal or with a powered welding electrode in contact therewith. For example, the body 102 may be made of aluminum, a light weight alloy steel, a high temperature resistant polymer, a fiberglass composite, or the likes, or a combination thereof. Other types of material or materials are also possible.

Referring, for example, to FIG. 3, the body 102 defines a first and a second set of apertures 122 and 124 extending through the thickness of the body 102. Each set of apertures 122 and 124 defines apertures in corresponding number and position relative to the exhaust manifold studs 200 and 202 associated with a respective one of two exhaust ports 302 along the cylinder head 300.

In an embodiment of the invention, each set of apertures 122 and 124 defines two (2) apertures. In another embodiment of the invention, each set of apertures 122 and 124 defines three (3) apertures. Other numbers of apertures per set of apertures 122 and 124 are also possible, such as one, four or more. Furthermore, in some embodiments, each set of apertures 122 and 124 may define a different number of apertures depending on the design of the cylinder head 300 and exhaust manifold custom configuration.

Figure 7:
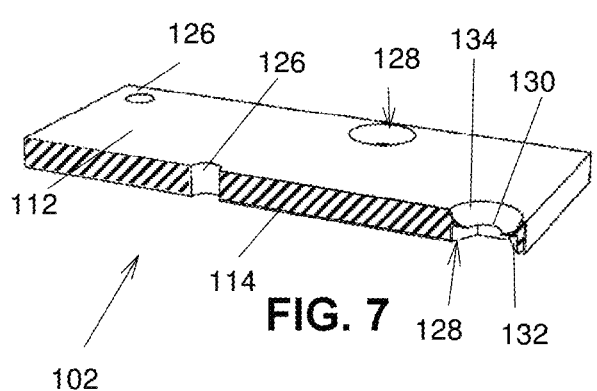
FIG. 7, in a perspective, cutaway view along section line VII-VII of FIG. 3, illustrates the body in FIG. 3.
Figure 10:
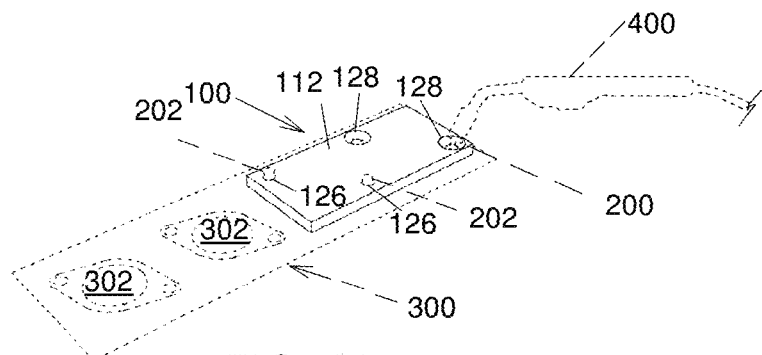
FIG. 10, in a perspective view, illustrates an other step in an embodiment of a method of removing a broken exhaust manifold stud using the tool in FIG. 1.

Referring more particularly to FIG. 7, each mounting aperture 126 in the first set of apertures 122 defines is configured to receive a protruding exhaust manifold strut 202. For example the mounting apertures 126 take the form of a cylindrical bore extending perpendicularly through the body 102 between the first and second surfaces 114 and 112. Typically, each mounting aperture 126 has a suitable diameter for freely receiving therein in a substantially snug fit relation a respective protruding exhaust manifold stud 202 in register therewith, as illustrated in FIG. 10. By substantially snug fit, it is meant that when the protruding exhaust manifold stud 202 is inserted in the mounting aperture 126, the latter cannot move transversally about the former, or can only move a distance that is a small fraction of the diameter of the protruding exhaust manifold stud, for example 1%, 5% or 10% of this diameter. Typically, no such movement is allowed. When such movements are allowed, they are small enough that they don't affect welding of the nut element 120 to the broken exhaust manifold stud 200, as described below.

Each nut holding aperture 128 in the second set of apertures 124 also extends between the first and second surfaces 114 and 112. The nut holding apertures 128 are in register respectively with the exhaust manifold stud of the exhaust port 302 adjacent to the broken exhaust manifold stud 200 when the body 102 is operatively mounted to the cylinder head 300.

Referring for example to FIG. 7, at least one of the nut holding apertures 128 defines a nut receiving portion 132 extending from the first surface 114, the nut element 120 being receivable in the nut receiving portion 132, a welding head portion 134 extending from the second surface 112 and configured and sized for receiving the welding head 400, and an intermediate portion 130 extending therebetween, the intermediate portion 130 being narrower than the nut element 120.

In some embodiments, the welding head portion 134 is substantially spherical cap shaped. This welding head portion 134 has a diameter larger than the intermediate portion typically. For example, as best illustrated in FIG. 10, the welding head portion 134 is sufficiently sized for allowing the relatively low profile welding head 400 of, for example, a Metal Inert Gas (MIG) welding tool to freely access at multiple angles the various portions of the top surface of the broken exhaust manifold stud 200 through intermediate portion 130 when the body 102 is flatly abutting in position over two adjacent exhaust ports 302.

In some embodiments, the nut element 120 has a substantially hexagonal peripheral edge 103 and the nut receiving portion 132 has a substantially hexagonal transversal cross-sectional configuration. The thickness of the nut element 120 and nut receiving portion may be substantially similar. In some embodiments, the nut receiving portion 132 is sized for slightly frictionally engaging the nut element 120 when the latter is inserted thereinto so that the body 102 can be positioned with minimal risk that the nut element 120 will fall therefrom.

Each one of the at least one nut element 120 takes the form for example of a commercially available shallow threaded nut or any equivalently configured hexagonal element with a nut bore 136 extending therethrough, threaded or not. For example, the shallow nut element 120 is substantially similar in diameter size and configuration to the original nuts used to mount the exhaust manifold on the studs of the cylinder head 300, except that it is relatively shorter in axial length.

Typically, each one of the at least one nut element 120 is made of a suitably hard steel for allowing a strong welding bond with the broken exhaust manifold stud 200, as well as for providing high torque resistance during an unscrewing operation of the broken exhaust manifold stud 200 using a key or ratchet tool.

Furthermore, as it will be apparent from the following description of a method of using the present invention, the relatively short axial length of the nut element 120, in cooperation with the use of the MIG welding tool, allow the welding of the nut element 120 on a broken exhaust manifold stud 200 in substantially limited spaces.

With references to FIGS. 9 to 11 inclusively, a method of use of the present invention will now be described. Beforehand, a cylinder head 300 has its exhaust manifold removed and at least one broken exhaust manifold stud 200 near the surface thereof.

In a first step, as illustrated in FIG. 9, a nut element 120 is inserted in a snug fit relation in at least one of the nut receiving portions 132 of the body 102 that is corresponding to one of the at least one broken exhaust manifold stud 200 associated with one exhaust port 302 of the cylinder head 300.

In second step, the body 102 has its mounting apertures 126 engaged on the non broken exhaust manifold studs 202 of the adjacent exhaust port 302 so as to have the first surface 114 of the body 102 abut flatly on the cylinder head 300, as illustrated in FIG. 10.

Still referring to FIG. 10, in a third step, using a welding head 400, a relatively strong weld bond is created between the end surface of the broken exhaust manifold stud 200, accessible through the nut bore 136 of the nut element 120, and the inner surfaces of the latter.

Figure 11:
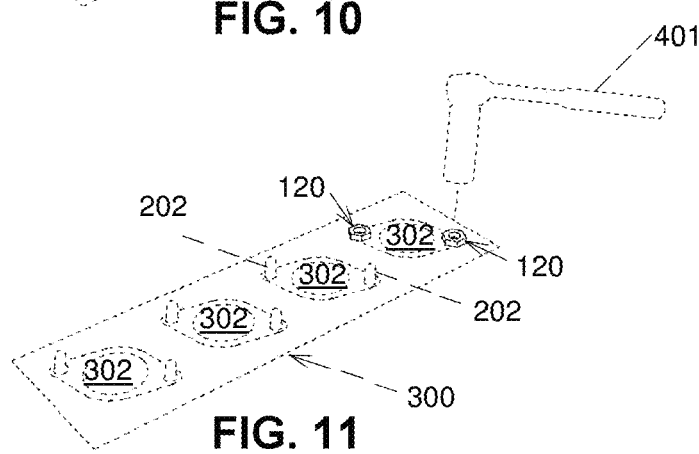
FIG. 11, in a perspective view, illustrates yet an other step in an embodiment of a method of removing a broken exhaust manifold stud using the tool in FIG. 1.

In a fourth step, as illustrated in FIG. 11, the body 102 is removed and a ratchet 401 or equivalent tool is used to unscrew the broken exhaust manifold stud 200. Hence a replacement threaded stud may be engaged in the threaded bore in the cylinder head 300.

Thus, there has been described a tool 100 and a method that facilitates the removal of a broken exhaust manifold stud 200 in the cylinder head 300 of a combustion engine installed in an engine bay defining limited space in the vicinity of the cylinder head 300. Furthermore, the relatively compact format of the tool 100 and method of the present invention allows maintenance personnel to save a significant amount of time, and thus, overall costs of repair for such a maintenance operation, when compared to known tools and methods, since the removal of the cylinder head 300, or the entire engine in some instances, can often be avoided to complete the repair.

As would be obvious to someone familiar with combustion engine maintenance, in the case of an exhaust manifold stud 202 that has broken only halfway its length and protrudes from the cylinder head 300, a compatible threaded nut may be engaged on the protruding threaded end thereof, followed with welding the nut thereon and unscrewing the broken exhaust manifold stud 200. In the case where the thread on the remaining portion of the partially broken exhaust manifold stud 200 is too damaged by rust, the protruding portion may be cut off followed with the use of the tool 100 of the present invention.

Figure 8:
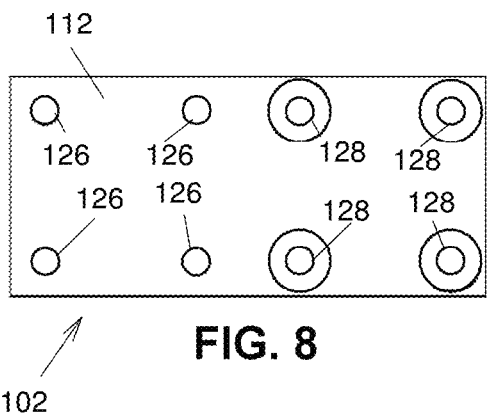
FIG. 8, in a top plan view, illustrates another embodiment of a body part of a tool for removing a broken exhaust manifold stud, according to the present invention.

Referring to FIG. 8, in some embodiments of the invention, the body further defines additional apertures 126 and 128 respectively, that are diametrically positioned, or mirrored, relative to the previously described apertures 126 and 128 and relative to the position of the associated exhaust port 302 associated therewith. Thus, on certain models of cylinder heads 300 having a symmetrical set of studs 202 around each cylinders, the body 102 may be rotated 180 degree so as to remove broken exhaust manifold studs 200 around the exhaust port 302 at each end of the cylinder head 300.

In some other embodiments of the invention (not shown in the drawings), each mounting aperture 126 in the first set of apertures 122 also defines a cavity that extends perpendicularly and at least partially inwardly relative to the second surface 112 of the body 102. Each of these cavities is substantially similar in size and configuration to the welding head portion 134 of the second set of apertures 124 described above except that each further extends inwardly substantially adjacently the opening of the aperture thereof along the first surface 114 of the body 102.

Thus, when two adjacent exhaust ports 302 have only broken exhaust manifold studs 200 to align on, these additional cavities allow the first set of apertures 122 to be easily visually aligned with a relatively high degree of precision in register with the broken exhaust manifold studs of a first exhaust port 302, and proceed with the welding of the nut elements 120 on the broken exhaust manifold studs 200 of the adjacent exhaust port 302.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. An assembly usable in combination with a welding head, the assembly comprising:
  a cylinder head having first and second exhaust ports, a broken exhaust manifold stud being mounted in the cylinder head adjacent the first exhaust port and a protruding exhaust manifold stud being mounted in the cylinder head adjacent the second exhaust port and protruding from the cylinder head; and
  a tool including
    a nut element defining a nut aperture extending therethrough;
    a body positioned adjacent the cylinder head, the body defining a first surface and an opposed second surface, the body defining a mounting aperture and a nut holding aperture each extending between the first and second surfaces, the mounting and nut holding apertures being in register respectively with the protruding exhaust manifold stud and the broken exhaust manifold stud, the first surface facing the cylinder head;
  wherein the mounting aperture substantially snugly receives the protruding exhaust manifold stud thereinto;
  wherein the nut holding aperture defines
    a nut receiving portion extending from the first surface, the nut element being received in the nut receiving portion;
    a welding head portion extending from the second surface configured and sized for receiving the welding head; and
    an intermediate portion extending therebetween, the intermediate portion being narrower than the nut element.

2. The assembly as defined in claim 1, wherein the body is substantially plate-shaped.

3. The assembly as defined in claim 1, wherein the body is made of a non-weldable material and the nut element is made of a hard steel.

4. The assembly as defined in claim 1, wherein the welding head portion is substantially spherical cap shaped.

5. The assembly as defined in claim 1, wherein the nut element has an hexagonal peripheral edge and the nut receiving portion has a substantially hexagonal transversal cross-sectional configuration.

6. The assembly as defined in claim 1, wherein the intermediate portion has a diameter substantially similar to a diameter of the protruding exhaust manifold stud.

7. The assembly as defined in claim 1, wherein an additional protruding exhaust manifold stud is mounted in the cylinder head adjacent the second exhaust port and protrudes from the cylinder head, the body defining an additional mounting aperture in register with the additional protruding exhaust manifold stud and receiving the additional exhaust manifold stud thereinto.

8. The assembly as defined in claim 1, wherein the body defines an additional mounting aperture and an additional nut holding aperture each extending between the first and second surfaces, the additional mounting and nut holding apertures being configured and sized to be in register respectively with mirror images of the protruding exhaust manifold stud and broken exhaust manifold stud.

9. The assembly as defined in claim 1, wherein the broken exhaust manifold stud is sectioned substantially flush with the cylinder head.

10. A tool usable in combination with a welding head for facilitating removal of a broken exhaust manifold stud from a cylinder head having first and second exhaust ports, the broken exhaust manifold stud being mounted in the cylinder head adjacent the first exhaust port, a protruding exhaust manifold stud being mounted in the cylinder head adjacent the second exhaust port and protruding from the cylinder head, the tool comprising:
- a nut element defining a nut aperture extending therethrough;
- a body, the body defining a first surface and an opposed second surface, the body defining a mounting aperture and a nut holding aperture each extending between the first and second surfaces, the mounting and nut holding apertures being configured and sized to be in register respectively with the protruding exhaust manifold stud and the broken exhaust manifold stud when the body is operatively positioned substantially adjacent the cylinder head with the first surface facing the cylinder head;

wherein the mounting aperture is configured and sized for substantially snugly receiving the protruding exhaust manifold stud thereinto;

wherein the nut holding aperture defines
- a nut receiving portion extending from the first surface, the nut element being received in the nut receiving portion;
- a welding head portion extending from the second surface configured and sized for receiving the welding head; and an intermediate portion extending therebetween, the intermediate portion being narrower than the nut element.

11. The tool as defined in claim 10, wherein the body is substantially plate-shaped.

12. The tool as defined in claim 10, wherein the body is made of a non-weldable material and the nut element is made of a hard steel.

13. The tool as defined in claim 10, wherein the welding head portion is substantially spherical cap shaped.

14. The tool as defined in claim 10, wherein the nut element has an hexagonal peripheral edge and the nut receiving portion has a substantially hexagonal transversal cross-sectional configuration.

15. The tool as defined in claim 10, wherein the intermediate portion has a diameter substantially similar to a diameter of the protruding exhaust manifold stud.

16. The tool as defined in claim 10, wherein an additional protruding exhaust manifold stud is mounted in the cylinder head adjacent the second exhaust port and protrudes from the cylinder head, the body defining an additional mounting aperture configured and sized to be in register with the additional protruding exhaust manifold stud when the body is operatively positioned substantially adjacent the cylinder head with the first surface facing the cylinder head.

17. The tool as defined in claim 10, wherein the body defines an additional mounting aperture and an additional nut holding aperture each extending between the first and second surfaces, the additional mounting and nut holding apertures being configured and sized to be in register respectively mirror images of the protruding exhaust manifold stud and broken exhaust manifold stud when the body is operatively positioned substantially adjacent the cylinder head with the first surface facing the cylinder head.

18. A method of using the tool as defined in claim 10, the method comprising:
- inserting the nut element in the nut receiving portion;
- positioning the body adjacent the cylinder head with the first surface facing the cylinder head, the protruding exhaust manifold stud inserted in the mounting aperture and the nut element substantially adjacent the broken exhaust manifold stud;
- welding the nut element to the broken exhaust manifold stud through the nut aperture;
- removing the body away from the cylinder head;
- removing the broken exhaust manifold stud from the cylinder head by unscrewing the broken exhaust manifold stud using the nut element welded to the broken exhaust manifold stud.

* * * * *